United States Patent [19]

Springer

[11] 4,394,129
[45] Jul. 19, 1983

[54] PROCESS FOR THE FINISHING OF FIBROUS MATERIALS: SULFONYL- OR CARBONYL-CYANAMIDES OF DYESTUFFS

[75] Inventor: Hartmut Springer, Königstein, Fed. Rep. of Germany

[73] Assignee: Hoechst Aktiengesellschaft, Frankfurt, Fed. Rep. of Germany

[21] Appl. No.: 296,469

[22] Filed: Aug. 26, 1981

Related U.S. Application Data

[63] Continuation of Ser. No. 179,992, Aug. 21, 1980, abandoned.

[30] Foreign Application Priority Data

Aug. 24, 1979 [DE] Fed. Rep. of Germany ....... 2934247

[51] Int. Cl.³ .................... C07C 125/08; C09B 33/15; D06P 1/16
[52] U.S. Cl. .......................................... 8/543; 8/192; 8/196; 8/661; 8/694; 8/917; 8/924; 8/918
[58] Field of Search ................... 8/661, 192, 196, 543, 8/694

[56] References Cited

U.S. PATENT DOCUMENTS

| | | | |
|---|---|---|---|
| 2,259,721 | 10/1941 | Anderson et al. | 260/397.7 R |
| 3,711,508 | 1/1973 | Groll | 260/314.5 |
| 4,213,757 | 7/1980 | Ruske et al. | 8/661 |

FOREIGN PATENT DOCUMENTS

| | | |
|---|---|---|
| 2454107 | 5/1975 | Fed. Rep. of Germany . |
| 2462011 | 6/1975 | Fed. Rep. of Germany . |
| 796697 | 6/1958 | United Kingdom . |

*Primary Examiner*—A. Lionel Clingman
*Attorney, Agent, or Firm*—Connolly and Hutz

[57] ABSTRACT

Fibrous materials of any kind is finished with an organic compound having fiber-finishing properties and containing one or several groups of the formula

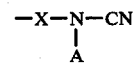

in which X is sulfonyl or carbonyl and A represents hydrogen or one equivalent of a mono-, bi- or trivalent metal or an ammonium group, is applied onto the fibrous material in the form of an aqueous or organo-aqueous solution or dispersion, and the fibrous material thus treated is then subjected, if necessary, to a heat treatment for the fixation of this organic compound onto the fibrous material. Organic fiber-finishing compounds containing the above-mentioned group may be for example dyestuffs, optical brighteners or compounds increasing the crease resistance.

1 Claim, No Drawings

PROCESS FOR THE FINISHING OF FIBROUS MATERIALS: SULFONYL- OR CARBONYL-CYANAMIDES OF DYESTUFFS

This application is a continuation of application Ser. No. 179,992 filed Aug. 21, 1980 now abandoned.

It has been found that organic compounds containing one or several radicals of formula (1)

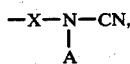

$$-X-N-CN, \quad (1)$$
$$\quad\ \ |$$
$$\quad\ \ A$$

in which X is sulfonyl or carbonyl and A stands for hydrogen or one equivalent of a mono-, bi- or trivalent metal, preferably an alkali metal, such as sodium or potassium, or preferably the ammonium group, are very well suitable for the finishing of fibrous materials of any kind.

Hence, the present invention provides a process for the finishing of fibrous materials of any kind (labelled fibrous materials in the following), which comprises applying an organic compound having fiber-finishing properties, to which one or several, for example two or three, radicals of formula (1) are bound, in the form of an aqueous solution or aqueous dispersion or organo-aqueous solution or organo-aqueous dispersion onto the fibrous material in common manner and thereafter optionally subjecting the fibrous material thus treated to a heat treatment.

The heat treatment is carried out as a rule at a temperature of from 60° to 230° C. It involves a faster (more permanent) fixation of the compound on the substrate. The upper limit of the possible heat treatment depends on the nature of the fibrous materials and its thermal stability. Generally, a heat treatment is not necessary, if the fibrous material contains hydroxy, amino or carbonamide groups, as is the case, for example, with natural or synthetic polyamide fiber materials or cellulose fiber materials and the derivatives thereof; however, a heat treatment, for example up to 100° C., is advantageous.

As organic compounds containing one or several radicals of formula (1) and being suitable for the finishing of fibrous materials, there may be mentioned, for example, active substances which impart to the fibrous materials water-repellent properties, a soft feel, a white tinting (optical brightening), crease resistance, an increased dyeing affinity or flame resistance. However, the most preferred compounds of this kind are dyestuffs which contain one or several radicals of formula (1).

Hence, the invention preferably provides a process for the dyeing of fibrous materials of any kind, wherein said dyestuffs are applied in an aqueous or organo-aqueous solution or dispersion onto the fibrous material in common manner, for example by padding, slop padding, printing or in a bath, and wherein the dyestuffs are fixed by being allowed to dwell at room temperature or at elevated temperature (for example from 15° to 60° C.), or by a heat treatment. In this manner there are obtained fast dyeings of these dyestuffs on the fibrous materials.

Dyestuffs containing one or several groups of formula (1) may belong to various dyestuff classes, for example of the series of triaryl methane, azine, dioxazine, phenazine, phenoxazine, nitro, stilbene, of vat, mono-, dis- or polyazo dyestuffs and especially of the series of phthalocyanine dyestuffs. Preference is given to water-soluble dyestuffs containing the group of formula (1) to be used according to the invention. A sufficient water-solubility may be obtained by the presence of a sufficiently large number of the water-solubilizing groups of formula (1) and/or by additional water-solubilizing groups of another kind, for example sulfonic acid and carboxylic acid groups which are bound to the dyestuff molecule.

The process of the invention may serve for the finishing of fibrous materials of any kind, for example textile fibers of natural or synthetic origin, such as wool or other animal hair, silk, synthetic protein fibers, synthetic polyamide fibers, such as polyamide-6, polyamide-66, polyamide-11, polyurethane fibers, cellulose fibers, such as cotton, hemp, linen, regenerated or acetylated cellulose, polyester fibers, for example those of terephthalic acid and ethylene glycol, polyacrylonitrile fibers or polyolefinic fiber materials, such as polyethylene or polypropylene fibers. In particular, mixtures of two or several of these types of fiber may also be employed in the process of the invention. The fibrous material may be present in any processing state, for example as loose fibers, as yarn or as fabric. Furthermore, the process of the invention is also suitable for the finishing of leather and other material of a fibrous structure, such as paper, cardboard, imitation leather, and the like.

As a rule, the process of the invention is carried out by applying a compound containing one or several radicals of formula (1) onto the fibrous material from an aqueous or organo-aqueous medium in accordance with application processes common in practice, for example those analogous to dyeing and printing processes. Said application may be performed from a neutral, alkaline or slightly acid medium at room temperature or elevated temperature, for example in the range of from 10° C. to 135° C. In the case of organo-aqueous solutions or dispersions of the organic compounds containing a radical of formula (1), the organic portion of the medium is preferably a water-miscible solvent, such as a lower alkanol, for example methanol or ethanol, or an aliphatic carbonamide, such as N-methyl pyrrolidone or dimethyl formamide. The solutions or dispersions containing the organic compound with the group of formula (1), which have been applied onto the fibrous material according to common application methods, may additionally contain common auxiliaries and finishing agents, such as neutral electrolytes, levelling agents, dispersing auxiliaries, migration auxiliaries, surfactants, urea, thickening agents, inorganic or organic acids and bases, or inorganic or organic acidic or basic salts.

The compound with a group of formula (1) which has been applied onto the fibrous material in the form of solutions or dispersions (or printing pastes, i.e. solutions or dispersions with thickening agents) is thereafter preferably subjected to a heat treatment, optionally after a drying process. This heat treatment may be effected, for example, by steaming with super-heated steam or pressurized steam, for example with steam having a temperature of from 100° to 160° C., or by a treatment with hot air according to known heat setting processes at a temperature of from about 150° C. to 230° C. The drying process by which the heat treatment may be preceded can be carried out at a temperature of from 30° to 100° C.

One of the variants of the process of the invention involves for example the finishing of fibrous materials by a direct treatment of said material from a liquor (bath) containing a solution or dispersion of an organic compound with a radical of formula (1) and optionally auxiliaries and other additives, in a manner analogous to the direct dyeing method (exhaustion method) in dyeing processes. This direct treatment may be performed at room temperature or elevated temperature, for example of from 20° to 110° C. Said direct treatment may be followed—preferably after an intermediate drying—by a heat treatment by heated steam or hot air. Another variant of the process of the invention, which is used with particular advantage for those organic compounds with a group of formula (1) which show only little affinity to the fiber, involves the application of the solution or dispersion of the organic compound with the group of formula (1) onto the fibrous material by way of padding or slop padding or spraying; in this case, too, the solution or dispersion of the organic compound may contain auxiliaries or other additives, as indicated above, for example neutral inorganic salts; it may be applied onto the fibrous material at room temperature or elevated temperature, for example of from 10° to 60° C. After this impregnation any excess solution or dispersion of the organic compound is squeezed off, and the material thus treated is subsequently allowed to dwell at room temperature or elevated temperature for the fixation of this organic compound and/or is subjected to a heat treatment, preferably after an intermediate drying.

If the organic compound with a group of formula (1) is applied onto the fibrous material according to printing processes, the corresponding paste which contains the organic compound with the group of formula (1) is prepared by using the additives common for this purpose, such as urea or dispersing agents and thickening agents, for example methyl cellulose or alginate thickeners. The goods are printed in common manner with these printing pastes and subsequently subjected—optionally after an intermediate drying—to a heat treatment, for example with steam or hot air.

The process of the invention gives materials with finished fibers which contain the active substance in a high yield (high degree of fixation) and with good fastness properties. Especially when using dyestuffs as organic compounds having a group of formula (1), very valuable full dyeings and prints are obtained which are marked by a very high fastness to wetting and light.

The organic compounds used according to the invention and having a group of formula (1) are novel. They may be prepared, for example, by reacting an organic compound, which already shows properties of an active substance (fiber finishing properties) and to which one or several sulfochloride of carboxylic acid chloride groups are bound, with cyanamide or its salts, such as sodium cyanamide. Said reaction may be executed in an aqueous or organo-aqueous medium, the addition of a water-miscible organic solvent possibly being advantageous; however, it is also possible to carry out the reaction in water-free organic solvents, for example lower alkanols, such as methanol, N-methyl pyrrolidone or dimethyl formamide. In the reaction of the sulfochloride group- or carboxylic acid chloride group-containing active substances with cyanamide or its salts it is advantageous to add acid-binding agents, for example sodium acetate, sodium or potassium bicarbonate, sodium or potassium carbonate, pyridine or other tertiary organic bases. The organic compounds having the group of formula (1) may also be prepared by starting from corresponding precursors which already contain the said group and by synthetizing the respective active substances from these precursors according to a common mode of operation known to chemists, for example in the preparation of azo compounds by coupling a diazonium compound common for azo dyestuffs with a coupling component containing the group of formula (1), thus obtaining a dyestuff of the present invention which may be used in accordance with the process claimed.

Examples for the synthesis of the organic compounds with fiber-finishing properties to be used in accordance with the invention, which compounds contain the group of formula (1), have been given in our patent application Ser. No. . . . filed concurrently herewith and based on German patent application No. P 2,934,248.1 of Aug. 24, 1979 (Assignee's reference: HOE 79/F 228).

The following Examples are to illustrate the invention. The parts are parts by weight, and the percentages are percent by weight, unless otherwise stated. Parts by volume are related to parts by weight as the liter is to the kilogram. The formula radicals CuPc, NiPc and CoPc stand in the Examples for the unsubstituted copper, nickel or cobalt phthalocyanine skeleton.

EXAMPLE 1

20 Parts of the dyestuff of the formula

CuPc—[SO$_2$—N(NH$_4$)—CN]$_4$ are dissolved in 1000 parts of water. In this dye bath a cotton fabric is treated at a goods-to-liquor ratio of 1:20 for one hour at 95° C. The fabric is then removed from the bath, squeezed off, dried and subjected for 2 minutes to a heat setting treatment at 210° C. Subsequently it is rinsed with cold and hot water and finally with a boiling weak soap solution. A turquoise blue dyeing is obtained which shows a high fastness to washing and a very high fastness to light.

EXAMPLE 2

15 Parts of the dyestuff of the formula

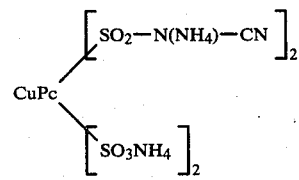

are dissolved together with 20 parts of urea in 200 parts of hot water. While stirring, 400 parts of a 4% aqueous sodium alginate thickener are added to the solution showing an intense turquoise blue shade. The paste thus obtained is made up to 1000 parts with water and thickener. A cotton fabric is printed with the printing paste thus obtained, dried and thereafter subjected to a heat setting treatment for 2 minutes at 210° C., then it is rinsed with cold and hot water and dried. There is obtained a full turquoise blue printing pattern which shows a high fastness to light and a very high fastness to washing.

EXAMPLE 3

Mercerized cotton fabric is padded at a temperature of from 20° to 80° C. (preferably 20° C.) with an aqueous solution containing 40 parts of the dyestuff of the formula $CuPc$—$[SO_2$—$N(NH_4)$—$CN]_4$ in 1000 parts by volume. The padded fabric is wound on a skein, wrapped with a plastic sheet and allowed to dwell for 24 hours at 20° to 80° C. (preferably 20° C.).

Subsequently the fabric thus treated is dried at 100° C. and subjected to a fixation treatment for 3 minutes with hot air of 220° C. Thereafter the resulting dyeing is rinsed with cold and hot water, treated for 10 minutes at boiling temperature in an aqueous liquor containing in 1000 parts 1 part of a non-ionogenic detergent (alkylaryl polyglycol ether), then rinsed again and dried. A turquoise blue dyeing being fast to washing is obtained which also shows a very high fastness to light.

EXAMPLE 4

100 Parts of a mercerized cotton fabric are treated at 80° C. for 60 minutes in 3000 parts by volume of an aqueous solution containing 20 parts of a dyestuff of the formula $CuPc$—$[SO_2N(NH_4)$—$CN]_4$ and from 3 to 6 parts of an ammonium salt, such as ammonium sulfate or monoammonium phosphate. Subsequently the fabric is squeezed on the padder so that the amount of dye liquor remaining on the fabric is 80% of the weight of the dry fabric. Thereafter the material is dried at 100° C. and subjected to fixation for 2 minutes with hot air of 220° C. The resulting dyeing is rinsed with cold and hot water, treated for 10 minutes at boiling temperature in an aqueous liquor containing in 1000 parts 1 part of a non-ionogenic detergent (alkylaryl polyglycol ether), then rinsed again and dried. A turquoise blue dyeing being fast to washing is obtained which also shows a very high fastness to light.

A practically equivalent dyeing result is obtained without the use of the ammonium salt.

EXAMPLE 5

A wool fabric is dyed in a dye bath which has been adjusted with acetic acid to a pH of 5.3 and which contains
1.5% of the dyestuff of the formula $CuPc$—$[SO_2$—$N(Na)$—$CN]_4$, 1% of a commercial slightly cationic levelling agent, for example on the basis of a fatty amine polyoxyethylate,
1% of an alkylphenyl polyglycol ether as dispersing agent, as well as
2% of ammonium acetate, each calculated on the weight of the wool fabric, at a goods-to-liquor ratio of 1:40 in the following manner:

The wool fabric is introduced into the dye bath which at first contains only the indicated chemicals and auxiliaries. After 10 minutes the dyestuff is added in dissolved form, the bath is heated within one hour to 98° C., and the material is dyed for one hour at this temperature. The dyestuff is uniformly absorbed by the wool fabric, thereafter the dye bath is exhausted. After dyeing, the fabric is thoroughly rinsed with water. A dyeing is obtained which shows favourable fastness properties with regard to wetting and light.

EXAMPLE 6

According to the method described in Example 5, a polyamide fabric is dyed in a dye bath having a pH of 4 and containing
1.5% of the dyestuff of the formula $CuPc$—$[SO_2$—$N(Na)$—$CN]_4$, 2% of a common anionic levelling agent, for example on the basis of a heterocyclic polysulfonic acid,
0.5% of a common levelling agent, for example on the basis of an alkylphenyl polyglycol ether, and
2% of 60% aqueous acetic acid.

A full turquoise blue dyeing is obtained.

EXAMPLES 7 TO 38

If the process is carried out according to the method of the invention, for example as has been described in one of the above Examples, save for using one of the dyestuffs mentioned in the following Table Examples in the form of its ammonium salt, instead of the dyestuffs employed in the above Examples, dyeings or prints are obtained which show the shade given for the respective Table Example and which have a high fastness to wetting.

| Example | Dyestuff | Shade of dyeing |
|---|---|---|
| 7 | $CuPc$—(3)—$(SO_2$—$NH$—$CN)_3$ | turquoise blue |
| 8 | $CuPc$—(3)—$(SO_2$—$NH$—$CN)_{2.5}$ | turquoise blue |
| 9 | $CuPc$—(3)—$(SO_2$—$NH$—$CN)_4$ | turquoise blue |
| 10 | $CuPc$—(3)$\diagup^{(SO_2-NH-CN)_3}_{\diagdown SO_3H}$ | turquoise blue |
| 11 | $CuPc$—(3)$\diagup^{(SO_2-NH-CN)_2}_{\diagdown (SO_3H)_2}$ | turquoise blue |

| Example | Dyestuff | Shade of dyeing |
|---|---|---|
| 12 | CuPc—(3)⟨(SO₂—NH—CN)₂ / SO₃H⟩ | turquoise blue |
| 13 | CuPc—(4)—(SO₂NH—CN)₄ | turquoise blue |
| 14 | NiPc—(3)—(SO₂NH—CN)₃ | blue green |
| 15 | CoPc—(3)—(SO₂—NH—CN)₃ | blue green |
| 16 | CuPc—(3,4',4'',4''')⟨(SO₂NH—CN)₂.₅ / (SO₃H)₁.₅⟩ | turquoise blue |
| 17 |  | green |
| 18 |  | blue |
| 19 |  | blue |
| 20 |  | blue |
| 21 |  | orange |
| 22 |  | yellow |

-continued
| Example | Dyestuff | Shade of dyeing |
|---|---|---|
| 23 | 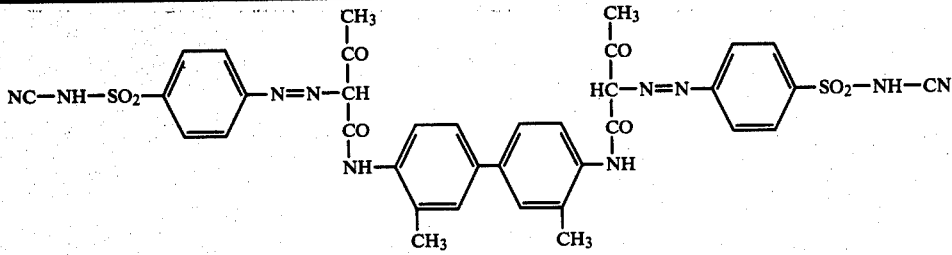 | yellow |
| 24 | 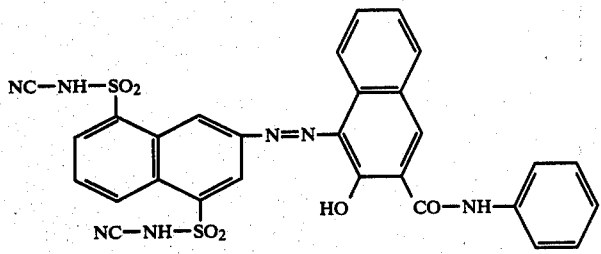 | red |
| 25 | 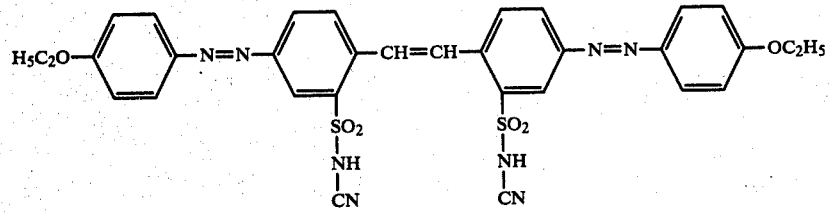 | yellow |
| 26 | 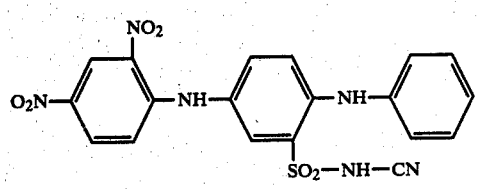 | orange |
| 27 | 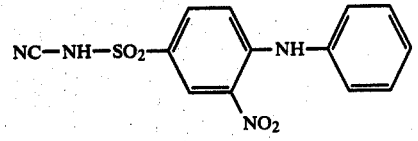 | yellow |
| 28 | 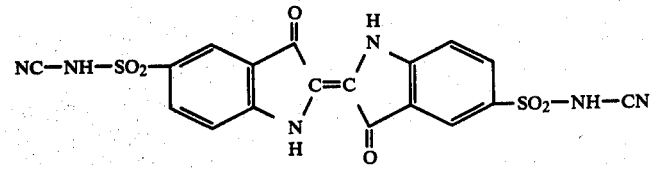 | blue |
| 29 | 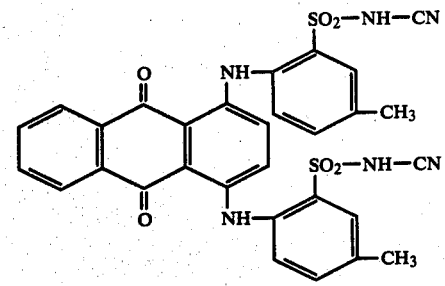 | green |

| Example | Dyestuff | Shade of dyeing |
|---|---|---|
| 30 | 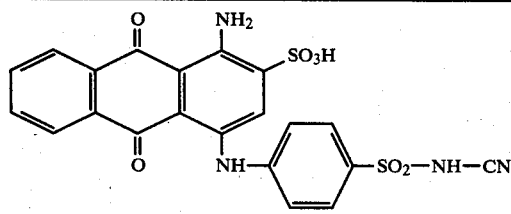 | blue |
| 31 | 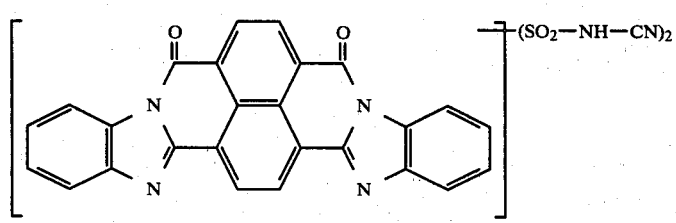 | brown |
| 32 | 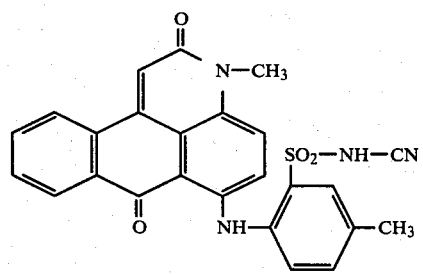 | red |
| 33 | 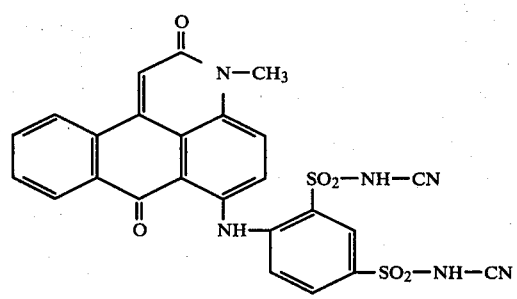 | red |
| 34 | Dyestuff prepared by the conversion of C.I. Solvent Black 5 (Colour Index No. 54015) by means of chlorosulfonic acid and thionyl chloride into the sulfochloride and reaction with cyanamide | black |
| 35 | 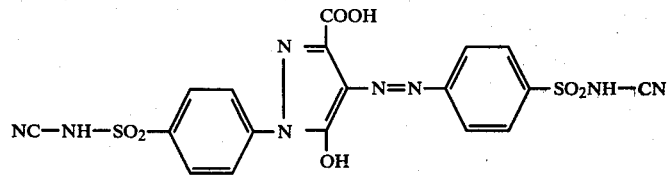 | yellow |
| 36 | 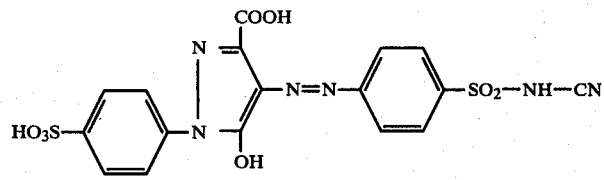 | yellow |

| Example | Dyestuff | Shade of dyeing |
|---|---|---|
| 37 | 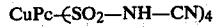 | yellow |
| 38 | 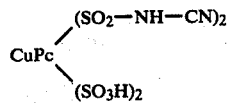 | yellow |

Synthesis Examples for illustrating the synthesis of the compounds which have a radical of formula (1) to be used according to the invention:

EXAMPLE I

The copper phthalocyanine dyestuff used in the above Example 1 may be obtained as follows:

97 Parts of copper phthalocyanine-(3)-tetrasulfochloride in the form of a moist filter cake are introduced into a solution of 21 parts of cyanamide and 20 parts of sodium hydroxide in 700 parts of water, while stirring thoroughly. The reaction starts with a slight heat development, and the temperature of the reaction mixture rises to about 30° C. By a constant dropwise addition of about 155 parts by volume of 2 N sodium hydroxide solution, the pH value of the reaction mixture is maintained at 10. The reaction is completed after about 6 hours, which becomes evident by the fact that no sodium hydroxide solution is consumed any longer; a clear solution has been formed. The solution is neutralized with hydrochloric acid and evaporated to dryness under reduced pressure. There are obtained 143 parts of a salt-containing turquoise blue dyestuff powder which has a 75% content of the sodium salt of the compound of the formula $$CuPc\text{-}(SO_2\text{---}NH\text{---}CN)_4$$

as dyestuff.

The compound of the formula $CuPc(SO_2NH\text{---}CN)_4$ may be obtained in its acidic form by acidifying the aqueous solution of the sodium salt obtained above with hydrochloric acid, filtering off the precipitated dyestuff acid, washing the same thoroughly with diluted aqueous hydrochloric acid and drying it under reduced pressure. From the dyestuff acid thus obtained, the ammonium salt may be prepared by dissolving the acid in water, while adding aqueous ammonia solution to achieve a neutral reaction, and evaporating the resulting solution to dryness under reduced pressure.

EXAMPLE II

The copper phthalocyanine dyestuff employed in the above Example 2 may be prepared as follows:

97 Parts of copper phthalocyanine-(3)-tetrasulfochloride are introduced in the form of a moist filter cake into a solution of 8.4 parts of cyanamide and 8.0 parts of sodium hydroxide in 300 parts of water, while stirring thoroughly. Due to the starting reaction the pH value of the reaction mixture decreases. It is maintained at 10 by constantly adding 2 N sodium hydroxide solution, and the mixture is stirred until no alkali metal hydroxide is consumed any more; for this purpose, about 310 parts by volume of 2 N sodium hydroxide solution are required. A deep blue solution has been formed. For isolating the resulting dyestuff, the mixture is acidified with 70 parts of concentrated hydrochlorid acid and the product is salted out with 200 parts of ammonium chloride. The precipitate is filtered off, washed thoroughly with diluted hydrochloric acid and dried under reduced pressure. There are obtained 96 parts of a dyestuff powder having a dyestuff content of 98%. The resulting dyestuff compound has the following formula (in the form of the free acid)

$$CuPc\begin{matrix}(SO_2\text{---}NH\text{---}CN)_2\\(SO_3H)_2\end{matrix}$$

The compound obtained is dissolved in 1200 parts of water while adding 27 parts of a 25% aqueous ammonia solution, and the resulting dyestuff solution is evaporated to dryness under reduced pressure. There are obtained 102 parts of the ammonium salt of the above phthalocyanine compound corresponding to the formula $$CuPc\begin{matrix}[SO_2\text{---}N(NH_4)\text{---}CN]_2\\(SO_3NH_4)_2\end{matrix}$$

EXAMPLE III

The dyestuff used in the above Example 19 may be prepared as follows:

A compound of the formula

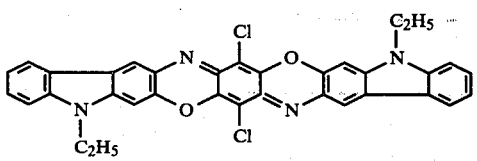

(known from Colour Index as C.I. Pigment Violet 23) is converted in known manner, by heating it for several hours with chlorosulfonic acid and subsequently treating the reaction mixture with thionyl chloride, into the corresponding sulfochloride compound, the amount of chlorosulfonic acid, the reaction temperature and time being such that an average of 3.5 sulfonic acid chloride groups are introduced into C.I. Pigment Violet 23. The sulfochloride compound is isolated and reacted with cyanamide in an aqueous suspension at a pH of 12.5 and a temperature of from about 20° to 50° C. The solution is then neutralized and evaporated to dryness under reduced pressure. The resulting dyestuff may be obtained in the form of the acid by acidifying the aqueous solution thereof with hydrochloric acid, filtering off the precipitated dyestuff acid, washing the product thoroughly with diluted aqueous hydrochloric acid and drying it under reduced pressure. From the dyestuff acid thus obtained, the ammonium salt may be prepared by dissolving the acid in water, while adding aqueous ammonia solution to achieve a neutral reaction, and evaporating the resulting solution to dryness under reduced pressure.

EXAMPLE IV

The azo dyestuff used in the above Example 21 may be obtained by preparing first the 3-aminophenylsulfonyl cyanamide as diazo component by the reaction of 3-acetylamino-benzene sulfochloride in aqueous suspension with cyanamide at a temperature of about 20° C. and a pH of about 9.5 and subsequent alkaline saponification of the acetylamino group at a pH of about 10 and a temperature of about 80° C. in common manner. The resulting amino compound is then diazotized in common manner and coupled with 5-hydroxynaphthyl-(1)-sulfonyl cyanamide. This coupling component may be prepared as follows: 1-Naphthol-5-sulfonic acid is acetylated in common manner, for example with acetic anhydride; thereafter the sulfonic acid group of this acyl compound is converted in known manner by means of phosphorus pentachloride into the sulfochloride group which is then reacted with cyanamide according to one of the methods mentioned in the above Examples, and the 1-acetyloxy-naphthalene-5-sulfonyl cyanamide compound thus prepared is converted into the above-mentioned coupling component by alkaline saponification in known manner.

EXAMPLE V

The disazo dyestuff used in the above Example 23 may be prepared as follows: As diazo component there is used 4-amino-phenylsulfonyl cyanamide which may be prepared in analogous manner as described in the above Example IV by reaction of 4-acetylamino-benzene sulfochloride with cyanamide and subsequent alkaline saponification. This amine is diazotized in common manner and coupled with 4,4'-bis-acetoacetylamino-3,3'-dimethylbiphenyl. The isolation, the preparation of the free acid or the conversion into the ammonium salt may be executed in analogous manner, as has been described in the above Example I.

EXAMPLE VI

The dyestuff used in Example 25 may be prepared as follows:

The compound of the formula

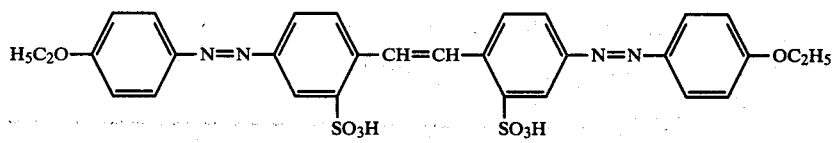

(prepared by tetrazotization of 4,4'-diamino-stilbene-2,2'-disulfonic acid and coupling with phenol and subsequent reaction with diethyl sulfate; known as C.I. Direct Yellow 12) is reacted with thionyl chloride under process conditions known for preparing sulfonic acid chlorides from the corresponding sulfonic acids. Subsequently the sulfochloride compound is converted in analogous manner, as has been described in one of the above Examples I to IV, with cyanamide in aqueous suspension at a pH of 12 into the dyestuff of Example 25. Said dyestuff may be isolated in analogous manner, as has been described in Example I, and may be converted into the ammonium salt.

EXAMPLE VII

The dyestuff used in the above Example 26 may be obtained as follows:

The compound of the formula

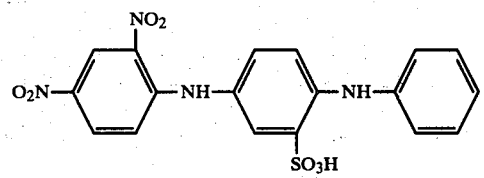

(known as C.I. Acid Orange 3) is converted, in a manner known for preparing sulfochloride compounds from the corresponding sulfonic acids, into the sulfonic acid chloride compound by means of thionyl chloride and subsequently reacted in analogous manner, as has been described in one of the above Examples I to IV, in aqueous suspension at pH 12 with cyanamide. The resulting dyestuff of Example 26 may be isolated in analogous manner, as has been described in Example I, or converted into the ammonium salt.

EXAMPLE VIII

4-Amino-phenylsulfonyl cyanamide (cf. the above Example V) is reacted in a manner known for preparing 4-phenylamino-1-amino-anthraquinone-2-sulfonic acids (cf. German patent specification No. 280 646) in a condensation reaction with 1-amino-4-bromo-anthraquinone-2-sulfonic acid ("bromoamino acid") and may be isolated or converted into the ammonium salt in analogous manner, as has been described in the above Example I.

EXAMPLE IX

In order to prepare the dyestuff used in the above Example 31, the compound of the formula

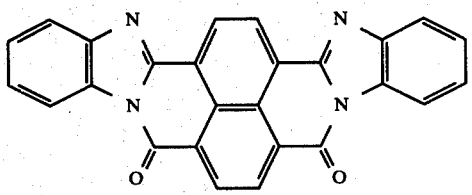

(known from Colour Index as C.I. Pigment Red 194) is converted in known manner with chlorosulfonic acid and thionyl chloride into the disulfochloride compound and thereafter reacted in aqueous suspension at a pH of 12 with cyanamide, to give the dyestuff of Example 31. The dyestuff obtained may be isolated and converted into the ammonium salt in accordance with the above Example I.

EXAMPLE X

The dyestuff used in the above Example 35 may be prepared by diazotizing 4-amino-phenylsulfonyl cyanamide (cf. the above Example V) and coupling it with acetylsuccinic acid ethyl ester, effecting in this azo compound in common manner under alkaline conditions the cyclization to give the pyrazolone ring with simultaneous or subsequent hydrolysis of the carbethoxy group to the carboxy group, and thereafter coupling the resulting compound of the formula

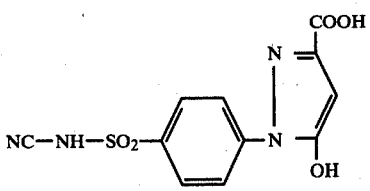

with a second mol of diazotized 4-aminophenylsulfonyl cyanamide to give the dyestuff of Example 35, which may be isolated or converted into the ammonium salt in a manner analogous to that of Example I above.

What is claimed is:

1. In a process for coloring a fibrous material made of wool, synthetic polyamide fibres or cellulose fibres, or of mixtures thereof, which comprises applying an organic dyestuff in the form of an aqueous or organo-aqueous solution or dispersion onto said fibrous material and treating it at a temperature of from 60° to 230° C. for fixation of the dyestuff on the substrate, the improvement consisting of employing as the organic dyestuff an organic dyestuff containing one or several groups of the formula

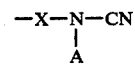

in which X is sulfonyl or carbonyl and A is hydrogen or the equivalent of a mono-, bi- or trivalent metal or is ammonium.

* * * * *